Dec. 23, 1924.  1,520,544
G. MEZEI
COMBINED MILK AND MAIL BOX
Filed March 13, 1924   2 Sheets-Sheet 1

Inventor
G. Mezei

By F. K. Bryant
Attorney

Dec. 23, 1924.
G. MEZEI
1,520,544
COMBINED MILK AND MAIL BOX
Filed March 13, 1924   2 Sheets-Sheet 2
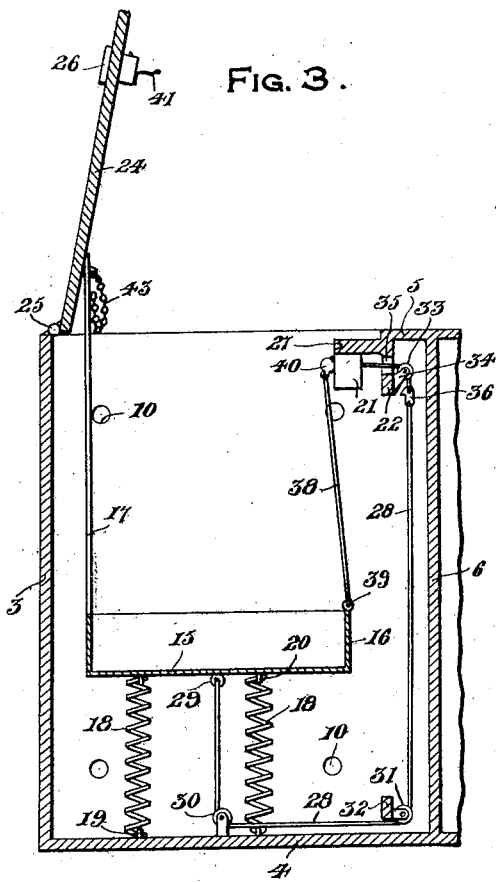
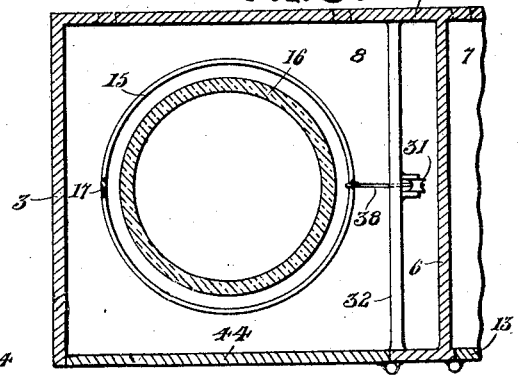
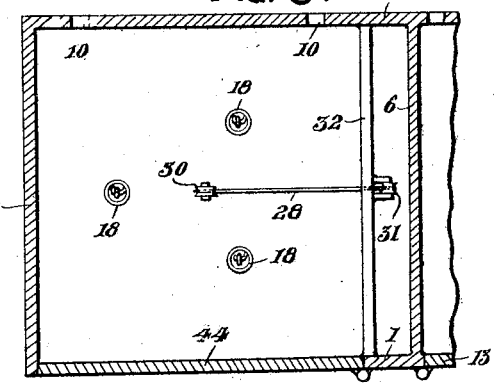
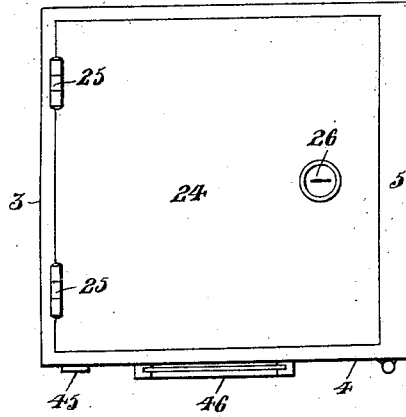
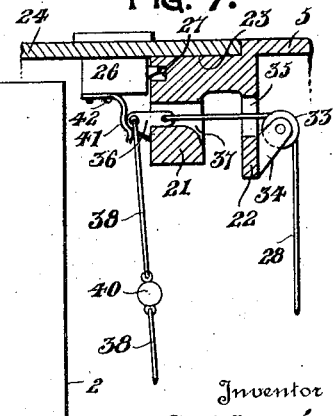
Inventor
G. Mezei
By F. K. Bryant
Attorney.

Patented Dec. 23, 1924.

1,520,544

UNITED STATES PATENT OFFICE.

GEORGE MEZEI, OF CLINCHCO, VIRGINIA.

COMBINED MILK AND MAIL BOX.

Application filed March 13, 1924. Serial No. 698,941.

*To all whom it may concern:*

Be it known that I, GEORGE MEZEI, a citizen of Hungary, residing at Clinchco, in the county of Dickenson and State of Virginia, have invented certain new and useful Improvements in Combined Milk and Mail Boxes, of which the following is a specification.

This invention relates to certain new and useful improvements in a combined milk and mail box wherein a box or receptacle has separate compartments therein for the reception of mail and milk bottles or other articles, the receptacle for the milk bottles having a cover lid that is automatically closed and locked when a bottle is placed therein while each receptacle or compartment is provided with locked doors permitting authorized access thereto.

A further object of the invention is to provide a combined milk and mail box of the type above set forth wherein the receiving compartment for the milk bottle is provided with a spring supported platform operatively connected with a closure lid for the milk compartment that is automatically closed and locked by the weight of a milk bottle placed upon the platform.

With the above and other objects in view that will become apparent as the nature of the invention is better understood, the same consists of the novel form, combination and arrangement of parts hereinafter more fully described, shown in the accompanying drawings and claimed.

Figure 1:
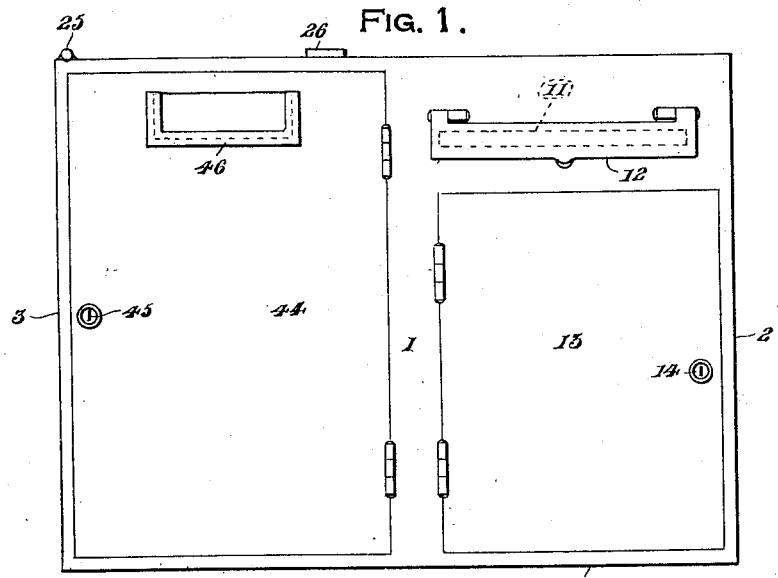
Figure 2:
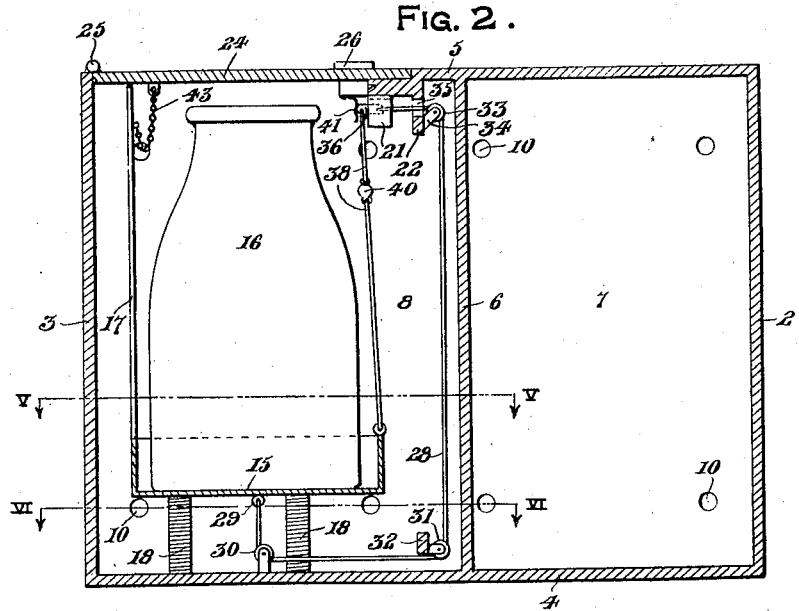

In the drawings, wherein like reference characters designate corresponding parts throughout the several views, Figure 1 is a front elevational view of a combined milk and mail box constructed in accordance with the present invention, Figure 2 is a vertical longitudinal sectional view showing a milk bottle in position therein, Figure 3 is a vertical cross-sectional view through the milk bottle compartment showing the closure lid therefor in an open position and with the spring supported platform elevated, Figure 4 is a top plan view of the box, Figure 5 is a detail horizontal sectional view taken on line V—V of Fig. 2, Figure 6 is a detail sectional view taken on line VI—VI of Fig. 2, and Figure 7 is an enlarged detail sectional view showing the lock and latch mechanism for the hinged cover of the milk compartment.

Referring more in detail to the accompanying drawings, there is illustrated a combined milk and mail box preferably of rectangular construction embodying a front wall 1, end walls 2 and 3, a bottom wall 4 and a top wall 5, the box being divided by the vertical partition 6 into a mail receiving compartment 7 and a milk bottle receiving compartment 8. The rear wall 9 of the box is provided with spaced openings 10 to facilitate mounting the box upon a convenient support such as a post or the wall of the house.

The front wall 1 of the mail compartment 7 is provided with a mail slot 11 that is covered by the hinged guard 12 while access to the mail compartment for the purpose of removing mail therefrom is afforded by the hinged door 13 carried by the front wall 1 that is normally retained in a closed position by the key operated lock 14.

The milk receiving compartment 8 encloses a platform 15 in the form of a receptacle for milk bottles 16ᴮ as shown in Fig. 2, the platform 15 including side walls 16 and being circular in plan view as shown in Fig. 5 with a rod 17 projecting upwardly from the edge thereof adjacent the end wall 3 of the box. The platform 15 is supported upon coil springs 18 that are anchored at their lower ends as at 19 to the bottom wall 4 of the box while the upper ends thereof are anchored at at 20 to the lower side of said platform, the springs 18 having a tendency normally to urge the platform in an upward direction.

The top wall 5 of the box terminates at a point spaced slightly beyond the partition 6 and overhangs the milk compartment 8, a block 21 depending from the edge of the top wall 5 being transversely cut away to provide a depending wall 22 shown more clearly in Fig. 7. The upper face of the block 21 is chamfered as at 23 and receives the free swinging end of the cover 24 for the milk compartment 8 that is hinged as at 25 at the upper edge of the end wall 3. The cover 24 is retained in a closed position as shown in Figs. 2 and 7 by the bolt of the key operated lock 26 carried by the cover 24 being received in the keeper socket 27 formed in the adjacent face of the block 21.

Guiding and movement limiting means for the platform 15 include a cable or cord 28 secured at one end as at 29 to the lower face of said platform and passing over the pulley 30 mounted upon the bottom wall 4 of the milk compartment, the cord 28 continuing over the pulley 31 carried by the cross bar 32 extending between the front and rear walls 1 and 9 of the box adjacent the bottom wall 4 as illustrated. A guide pulley 33 carried by the bracket 34 upon the depending wall 22 has the cord 28 passed thereover and through an opening 35 in said wall for attachment to one end of a latch lug 36 that is movable through an opening 37 formed in the block 21 in alinement with the opening in said wall. A second cord 38 attached at one end as at 39 to the upper edge of the side wall 16 of the platform carries an abutment 40 intermediate the ends thereof while the opposite end of the cord 38 is anchored to the other end of the latch lug 36. When the platform 15 is in its lowered position supporting a milk bottle as illustrated in Fig. 2, the spring finger 41 secured as at 42 to the lower face of the lock casing 26 engages the latch lug 36 for holding the same in engagement with the adjacent shoulder at the opening 37 in the block 21 and when the cover 24 is elevated as shown in Fig. 3, the spring finger 41 disengages the latch lug 36 from the lock shoulder and permits the latch lug to pass through the openings 37 and 35 to assume the position shown in Fig. 3. A chain connection 43 is formed between the cover 24 adjacent its hinged edge and the upper end of the rod 17, the opening movement of the cover tending to elevate the platform and assist the springs 18 in raising the same. The front wall of the milk compartment 8 is provided with a hinged door 44 normally retained in a closed position by the key operated lock 45 while a guide 46 carried by the door 44 is adapted to receive a card or the like indicating the amount of milk desired.

From the above detail description of the invention, it is believed that the construction and operation thereof will at once be apparent, and while there is herein shown and described the preferred embodiment of the present invention, it is nevertheless to be understood that minor changes may be made therein without departing from the spirit and scope of the invention as claimed.

What is claimed as new is:—

1. In a combined mail and milk box, a box having a vertical partition therein dividing the same into mail and milk compartments, the milk compartment having an entrance opening and closure lid therefor, an exit opening and closure door, a bottle supporting platform in the milk compartment, means for resiliently supporting said platform, connections between the platform and lid to cause upward movement of the platform upon opening movement of the lid, an apertured block carried by the upper wall of the box, a cord extending thru the block aperture having one end attached to one side of the platform and the other end attached to the lower side of the platform, guide pulleys for the cord and means carried by the cord cooperating with the block for holding the platform lowered to compress the resilient support for said platform.

2. In a combined mail and milk box, a box having a vertical partition therein dividing the same into mail and milk compartments, the milk compartment having an entrance opening and closure lid therefor, an exit opening and closure door, a bottle supporting platform in the milk compartment, means for resiliently supporting said platform, connections between the platform and lid to cause upward movement of the platform upon opening movement of the lid, an apertured block carried by the upper wall of the box, a cord extending thru the block aperture having one end attached to one side of the platform and the other end attached to the lower side of the platform, guide pulleys for the cord, means carried by the cord cooperating with the block for holding the platform lowered to compress the resilient support for said platform, and a lock for the lid cooperating with the means carried by the cord adapted to release the latter upon opening movement of the lid.

3. In a combined mail and milk box, a box having a vertical partition therein dividing the same into mail and milk compartments, the milk compartment having an entrance opening and closure lid therefor, an exit opening and closure door, a bottle supporting platform in the milk compartment, means for resiliently supporting said platform, connections between the platform and lid to cause upward movement of the platform upon opening movement of the lid, an apertured block carried by the upper wall of the box, a cord extending thru the block aperture having one end attached to one side of the platform and the other end attached to the lower side of the platform, guide pulleys for the cord, means carried by the cord cooperating with the block for holding the platform lowered to compress the resilient support for said platform, a lock for the lid, and a spring finger carried by the lock adapted to engage the means carried by the cord to release the same from the block and permit upward movement of the platform.

In testimony whereof I affix my signature.

GEORGE MEZEI.